(12) United States Patent
Wagner et al.

(10) Patent No.: US 8,378,816 B2
(45) Date of Patent: Feb. 19, 2013

(54) SYSTEM AND METHOD TO ASSESS SIGNAL SIMILARITY WITH APPLICATIONS TO DIAGNOSTICS AND PROGNOSTICS

(75) Inventors: John R. Wagner, Seneca, SC (US); Hany F. Bassily, Oviedo, FL (US); Robert B. Lund, Seneca, SC (US)

(73) Assignee: Clemson University, Clemson, SC (US)

( * ) Notice: Subject to any disclaimer, the term of this patent is extended or adjusted under 35 U.S.C. 154(b) by 481 days.

(21) Appl. No.: 12/668,768

(22) PCT Filed: Jul. 17, 2008

(86) PCT No.: PCT/US2008/070266
§ 371 (c)(1),
(2), (4) Date: Jun. 14, 2010

(87) PCT Pub. No.: WO2009/012354
PCT Pub. Date: Jan. 22, 2009

(65) Prior Publication Data
US 2010/0253512 A1  Oct. 7, 2010

Related U.S. Application Data

(60) Provisional application No. 60/950,164, filed on Jul. 17, 2007.

(51) Int. Cl.
*G08B 21/00* (2006.01)
*G01N 9/24* (2006.01)
*G01B 17/02* (2006.01)
*G06F 17/18* (2006.01)

(52) U.S. Cl. ............. 340/540; 73/602; 73/609; 702/179
(58) Field of Classification Search .................. 340/540; 73/602, 609; 702/179
See application file for complete search history.

(56) References Cited

U.S. PATENT DOCUMENTS

| | | | | |
|---|---|---|---|---|
| 5,202,930 A | * | 4/1993 | Livshitz et al. | 382/122 |
| 6,370,289 B1 | * | 4/2002 | Bennett | 385/12 |
| 6,438,440 B1 | * | 8/2002 | Hayashi | 700/121 |
| 6,564,119 B1 | * | 5/2003 | Vaculik et al. | 700/146 |
| 6,766,275 B2 | * | 7/2004 | Samata et al. | 702/184 |
| 6,909,993 B2 | * | 6/2005 | Nakao et al. | 702/185 |
| 7,421,351 B2 | * | 9/2008 | Navratil | 702/58 |
| 7,427,914 B2 | * | 9/2008 | Plantamura | 340/438 |
| 7,577,190 B2 | * | 8/2009 | Denk et al. | 375/224 |
| 7,684,320 B1 | * | 3/2010 | Nucci | 370/229 |
| 7,701,336 B1 | * | 4/2010 | Willms et al. | 340/540 |
| 8,090,161 B2 | * | 1/2012 | Kaplan | 382/119 |
| 8,285,498 B2 | * | 10/2012 | Saarinen et al. | 702/56 |
| 2003/0117317 A1 | * | 6/2003 | Vanderwerf et al. | 342/357.02 |
| 2004/0230385 A1 | * | 11/2004 | Bechhoefer et al. | 702/57 |
| 2005/0195103 A1 | * | 9/2005 | Davis et al. | 342/99 |
| 2007/0022062 A1 | * | 1/2007 | Grothmann et al. | 706/15 |
| 2007/0067678 A1 | * | 3/2007 | Hosek et al. | 714/25 |
| 2008/0154544 A1 | * | 6/2008 | Navratil | 702/183 |

(Continued)

*Primary Examiner* — Daniel Wu
*Assistant Examiner* — Kam Ma
(74) *Attorney, Agent, or Firm* — Dority & Manning, P.A.

(57) ABSTRACT

Signal processing technology for assessing dynamic system similarity for fault detection and other applications is based on time- and frequency-domain time series analysis techniques and compares the entire autocorrelation structure of a test and reference signal series. The test and reference signals are first subjected to similar pre-processing to help guarantee signal stationarity. Pre-processing may include formation of multivariate signal clusters, filtering and sampling. Multivariate periodograms or autocovariance functions are then calculated for each signal series. Test statistics are computed and assessed to determine the equality of the test and reference signals. When the difference between sample autocovariance functions or periodograms of such signals exceeds a preselected threshold value, fault detection signals and/or related diagnostic information are provided as output to a user.

15 Claims, 11 Drawing Sheets

U.S. PATENT DOCUMENTS

| | | | |
|---|---|---|---|
| 2010/0090884 A1* | 4/2010 | Venkatachalam et al. | 342/159 |
| 2010/0195774 A1* | 8/2010 | Lopez de Victoria | 375/343 |
| 2010/0253512 A1* | 10/2010 | Wagner et al. | 340/540 |
| 2010/0280772 A1* | 11/2010 | Saarinen et al. | 702/56 |
| 2011/0007940 A1* | 1/2011 | Hamza et al. | 382/103 |
| 2011/0258044 A1* | 10/2011 | Kargupta | 705/14.49 |

* cited by examiner

US 8,378,816 B2

SYSTEM AND METHOD TO ASSESS SIGNAL SIMILARITY WITH APPLICATIONS TO DIAGNOSTICS AND PROGNOSTICS

PRIORITY CLAIM

This application claims the benefit of priority of previously filed provisional application with the same title and inventors as present, having U.S. Provisional Patent Application Ser. No. 60/950,164, filed Jul. 17, 2007, which is incorporated herein by reference for all purposes.

BACKGROUND OF THE INVENTION

Various engineering technologies have been developed for use in a wide variety of scientific and other environments, including but not limited to the fields of engineering, (geo) physics, biology, astrophysics, medicine, econometrics, military applications and analysis of economics and environmental and other sciences. The systems and technologies developed in these fields and others are often quite complex, thus requiring modeling techniques to monitor and analyze system performance. In particular, diagnostics techniques for detecting fault occurrence(s) by analyzing sensory information are often beneficial approaches to system modeling.

Diagnostic strategies are generally designed to compare parameters associated with an operational system to some sort of theoretical reference of the same parameters. More particularly, some diagnostic methods that assess signal behavior typically analyze system residuals, or errors between a system's actual measured behavior and that of a benchmark/reference condition quantifying normal or expected behavior. Most diagnostic strategies can be broadly characterized as either a Model-Based or Model-Free approach. In model-based methods, an analytical model generates the reference system conditions. Exemplary model-based implementations include parameter estimation (e.g., that provide equation and/or output error determinations), observer-based methods (e.g., Kalman residuals and fault filters), parity space equations, and transfer functions (e.g., frequency response). In contrast, model-free techniques primarily rely on the actual operational system parameters for referencing and diagnostics. Exemplary model-free implementations include heuristic and fuzzy methods (e.g., Bayesian and Decision Algorithms), vibrations analysis methods or signal-based methods (e.g., frequency domain methods such as Fast Fourier Transforms (FFTs) or wavelet transforms and limit checking) and learning methods (e.g., neural networks and stochastic methods such as those involving time series analysis).

Several specific distinctions can be drawn between model-based and model-free diagnostics. With particular reference to conventional model-based diagnostics, analytic redundancy of different signals ensures that each signal can be reproduced by an analytic model. The core aspect of model-based diagnostic techniques is a comparison between the model-generated signal and the actual signal.

With particular regard to conventional model-free diagnostics, signals are directly processed in the time or frequency domain to extract certain signal properties and subsequent analysis of those properties is then performed. Anomaly criteria are based on a static template of healthy system properties, thus disregarding the potential effects of actual system dynamics. The absence of a redundant reference in model-free diagnostic techniques can sometimes compromise the robustness of such technology.

Several issues have been identified as potential concerns with presently existing model-free and model-based diagnostic techniques. In general, some traditional models often fail to accurately describe the system behavior due to measurement uncertainties, nonlinear effects and oversimplified assumptions. Other more particular concerns are based on development limitations in conventional model-based diagnostics which focus on the introduction of signal-processing concepts (e.g., wavelet decomposition, fuzzy logic and Kalman filtering) to classical modeling approaches. Conventional analytical models were substituted by learning-based models to decrease modeling uncertainties. Diagnostics did not fully address the analogies between conventional dynamic concepts (e.g., impulse response and stability) and major stochastic properties such as autocovariance and stationarity. The only multivariate approach involves principle component analysis which typically disregards the system dynamic characteristics.

In light of existing techniques for analyzing system performance, a need remains for a technique that addresses two main fundamentals—whether or not system behavior has changed over time and whether two signals obey the same structure. These fundamentals are generally addressed in accordance with the presently disclosed technology by prognostics (describing and forecasting slow time drifts in system behavior) and diagnostics (detecting and defining system departures from normal or reference behavior). In one embodiment of the present technology, a rigorous statistical method and enhanced diagnostics tool minimizes misclassification errors and wrong conclusions and also applies multivariate time series techniques in assessing the intrinsic dynamics of a certain system.

BRIEF SUMMARY OF THE INVENTION

Objects and advantages of the present invention will be apparent to one of skill in the art upon careful review of the disclosure and/or practice of the subject matter. The objects and advantages include providing methods and systems for assessing the dynamic similarity of two or more dynamic systems. The diagnostic techniques enable system assessment without the need for mathematical models. The methodology also provides for customized error thresholds to tailor different levels of signal equality and comparison. Still further, the techniques may be applied to a wide spectrum of potential applications, including system fault diagnosis and similarity assessment of two time series arising in engineering and non-engineering applications (e.g., meteorological, biological, geological, astrological, and others).

Signal processing technology for assessing dynamic system similarity for fault detection and other applications is based on time- and frequency-domain time series analysis techniques and compares the autocorrelation structure of a test and reference signal series. The test and reference signals may first be subjected to optional similar pre-processing to help guarantee signal stationarity. Pre-processing, if applied, may include formation of multivariate signal clusters, filtering and sampling. If frequency-domain analysis is employed, multivariate periodograms are then calculated for each signal series. If time-domain analysis is employed, auto covariance functions are calculated for each signal series. Time-domain or frequency-domain test statistics are computed and assessed to determine the equality of the test and reference signals. When the difference between sample autocovariance functions or periodograms of such signals exceeds a preselected threshold value, fault detection signals or other diagnostic outputs are provided to a user.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1A:
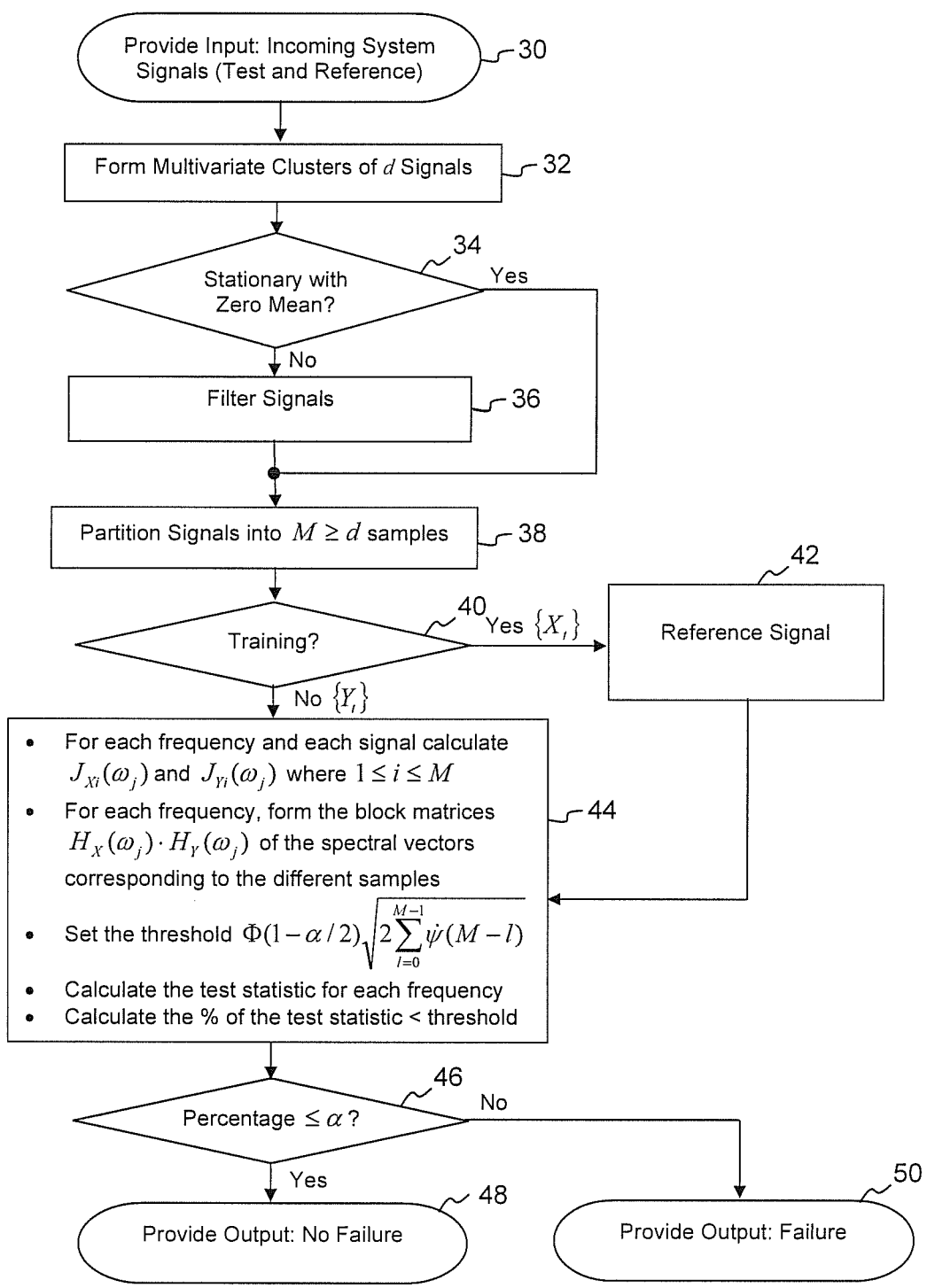
FIG. 1a is a flow diagram of exemplary steps associated with frequency-domain signal processing techniques of the present invention.

Repeat use of reference characters in the present specification and drawings is intended to represent the same or analogous features or elements of the present invention.

DETAILED DESCRIPTION OF THE INVENTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure. For instance, features illustrated or described as part of one embodiment may be used on another embodiment to yield a still further embodiment. Thus, it is intended that the present disclosure includes modifications and variations as will be appreciated by one of ordinary skill in the art.

The specification makes use of the following variables and nomenclature, which are presented in a reference format for convenience of the reader:

TABLE 1

Nomenclature Reference List

| | |
|---|---|
| AN | Asymptotic normal variable |
| d | Multivariate signal dimension |
| $E(x)$ | Expectation of quantity x |
| F | Fault signal |
| $F(\omega)$ | Spectral density function at frequency $\omega$ |
| G | Spectral Gram matrix |
| H | Spectral block matrix |
| $I(\omega)$ | Periodogram of multivariate time series, Identity matrix ($R^{d \times d}$) |
| $J(\omega)$ | Fourier transform at frequency $\omega$ |
| k, h | Time lags |
| L | Predetermined number of lag intervals |
| M | Total number of signal samples |
| N | Time series length, Normal distribution |
| $P(A)$ | Probability of event A |
| S | Spectral decomposition matrix |
| t | time |
| $t_c$ | Time of high value of autocorrelation |
| TS | Test Statistic |
| u | System input |
| W | Window length, Wishart distribution |
| $\{X_l\}$ | Reference multivariate signal |
| X | System state, Signal component |
| $\{Y_l\}$ | Test multivariate signal |
| Y | System output |
| Z | Standard complex normal variable ($C^d$) |
| $\{Z(t)\}$ | White noise signal |
| $\alpha$ | Error probability |
| $\Gamma(h)$ | Multivariate covariance function at lag h |
| $\gamma(h)$ | Single variable covariance function at lag h |
| $\kappa$ | Sampling time buffer zone |
| $\Sigma$ | Summation |
| $\Phi$ | Standard normal distribution |
| $\psi$ | Euler digamma function |
| $\omega_k$ | Fourier frequency $2\pi k/N$ |

In general, the disclosed technology provides a system and related methodology for assessing the dynamic similarity of two system signals. Although the disclosure makes reference to comparison of signals associated with two systems (test and reference), it should be appreciated that more systems may be analyzed in accordance with the presently disclosed techniques. Still further, any number of test parameters associated with the selected systems may also be analyzed using the disclosed technology. The specific number of systems and signals as described herein is merely as an example and should not be unnecessarily limiting to the disclosed technology.

Figure 2A:
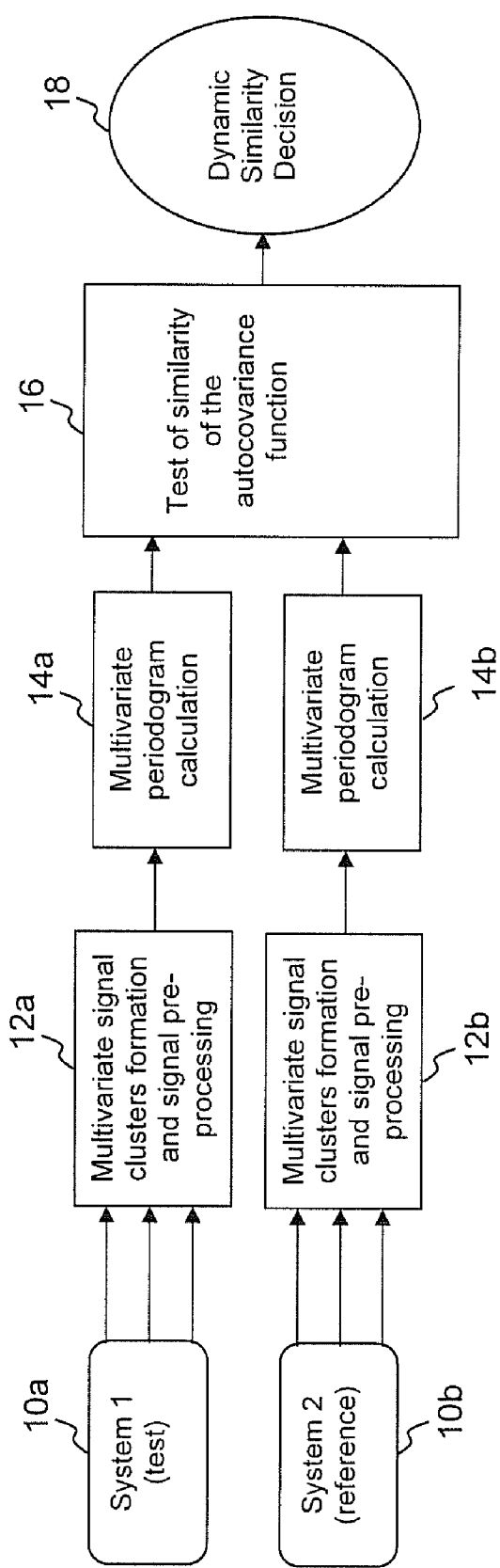
FIG. 2a is a flow diagram of additional exemplary steps associated with frequency-domain signal processing techniques of the present invention.
Figure 2B:
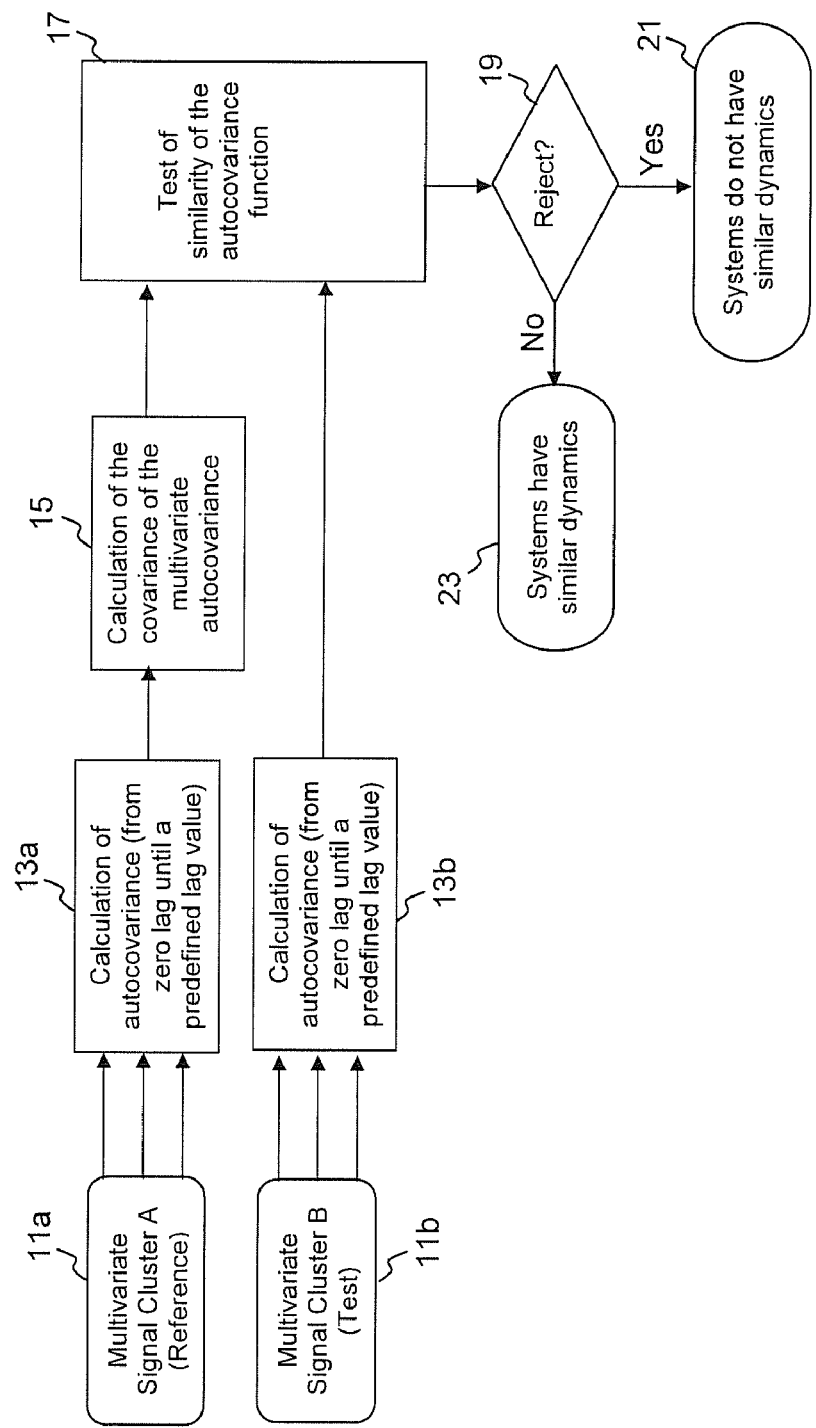
FIG. 2b is a flow diagram of additional exemplary steps associated with time-domain signal processing techniques of the present invention.

FIGS. 2a and 2b are now discussed—first, with reference to the exemplary frequency-domain processing techniques of FIG. 2a and second, with reference to the exemplary time-domain processing techniques of FIG. 2b.

Referring now to FIG. 2a, a first set of signals 10a corresponds to the test signals and a second set of signals 10b corresponds to reference signals. The required data forming these two signal sets 10a and 10b can be gathered from a variety of sources, including but not limited to real time monitoring of the system, historical inventories of similar systems, simulated data generated from analytical models and the like. Embodiments of the invention are based on time- and frequency-domain time series analysis techniques and differ from principal component discrimination techniques in that the entire autocorrelation structure of the target and reference series are compared, as opposed to just the variance. Also, direct assessment of the dynamic system conditions is achieved with the same level of redundancy and without the need for analytical models.

Referring still to FIG. 2a, additional exemplary steps associated with a dynamic system assessment method will now be discussed. Both sets of system signals, test signals 10a and reference signals 10b, may optionally be subjected to respective pre-processing steps 12a and 12b respectively. In one embodiment, preprocessing steps 12a and 12b are the same for both signal sets 10a and 10b to help guarantee statistical stationarity. In some other embodiments, pre-processing techniques that are similar yet not identical could be utilized. In one embodiment, pre-processing steps 12a and 12b involve forming multivariate signal clusters that are selected according to the dynamic system aspect to be assessed. In subsequent respective steps 14a and 14b, the periodogram (a spectral density estimate such as but not limited to a Fast Fourier Transform (FFT)) is calculated for each pre-processed signal set. If the signals are multivariate, then a multivariate periodogram is calculated for each set of signals. Dynamic properties of the test and reference signals are then compared in step 16 by testing the similarity of the autocovariance functions of the two system signals. With more particular reference to step 16, frequency-domain signal discrimination test statistics are computed and assessed. Equality of the test and reference signals is rejected when the multivariate periodograms are too dissimilar. This signal assessment involves rigorous statistical quantification and is based on asymptotic chi-squared statistical properties of the sample autocovariance functions. Additional aspects of these signal properties and calculations will be presented later in further detail.

With reference to FIG. 2b, additional aspects of the disclosed signal processing techniques as may be performed using time-domain signal analysis are now discussed. It should be appreciated that some aspects illustrated or described in FIG. 2b are similar to aspects illustrated in FIG. 2a, and either process may include or exclude some of the features or steps that are shown in one figure and not the other.

In FIG. 2b, a first multivariate signal cluster A corresponds to a set of reference signals 11a and a second multivariate signal cluster B corresponds to a set of test signals 11b. These signal groupings are similar to signal sets 10a and 10b depicted in FIG. 2a, yet are already provided in multivariate cluster form. Although not illustrated in FIG. 2b, both sets of system signals, reference signals 11a and test signals 11b, may optionally be subjected to respective pre-processing steps, such as steps 12a and 12b described relative to FIG. 2a. In subsequent respective steps 13a and 13b, the sample autocovariance $\{\hat{\gamma}_{i,j}(h)\}_{i,j=1}^{d}$ is calculated for each optionally pre-processed reference signal set $\{X_t\}$ and test signal set $\{Y_t\}$. The autocovariances from steps 13a and 13b are calculated for the time lags h from h=0, 1, ..., L, where L is a value that can be predefined by a system user, depending on the desired length of signal comparison testing. For the reference signal set, the covariance of the multivariate auto covariance is also calculated in step 15. Dynamic properties of the test and reference signals are then compared in step 17 by generating the test statistics for the respective test and reference signals and testing the similarity of the autocovariance functions of the two system signals. With more particular reference to step 17, time-domain signal discrimination test statistics are computed and assessed. Equality of the test and reference signals is rejected when the sample autocovariance of the two signals differs greatly. If rejection occurs in step 19, then diagnostic outputs might indicate in step 21 that the two systems do not have similar dynamics. If rejection does not occur in step 19, then diagnostic outputs might indicate in step 23 that the two systems do have similar dynamics. As with FIG. 2a, more particular aspects of the rigorous statistical quantification involved in FIG. 2b will now be presented in greater detail.

In accordance with exemplary aspects of the disclosed signal processing techniques, relevant second order statistical properties such as the second order moments of the test and reference time series are calculated. When the test and reference signals are Gaussian, signal equality is implied in a distributional sense when the autocovariance functions coincide. It should be appreciated that other second-order statistical modeling variations are within the spirit and scope of the presently disclosed techniques.

Exploiting these second order statistical properties for fault diagnosis purposes and others can facilitate understanding of the system's intrinsic dynamics without reliance on any analytical representation of the system's physical phenomena. The autocovariance is defined as $\gamma_X(k)=\text{Cov}(X_t, X_{t+k})$, where k is the time lag. The autocovariance is an even function (i.e., $\gamma_X(k)=\gamma_X(-k)$) and independent of t for stationary systems. The variance is $\gamma_X(0)=E[X_t^2]$ for zero mean signals, and the autocorrelation function is expressed as $$\sigma_X(k) = \frac{\gamma_X(k)}{\gamma_X(0)} = Cor(X_t, X_{t+k}).$$

Figure 4:
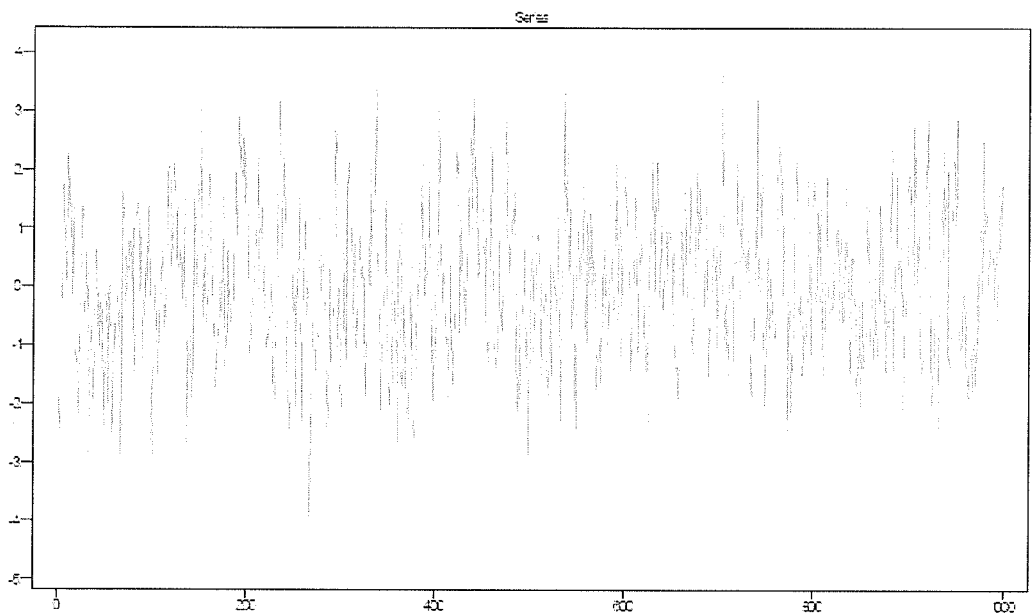
FIG. 4 is a graphical representation of an exemplary system output signal.
Figure 5:
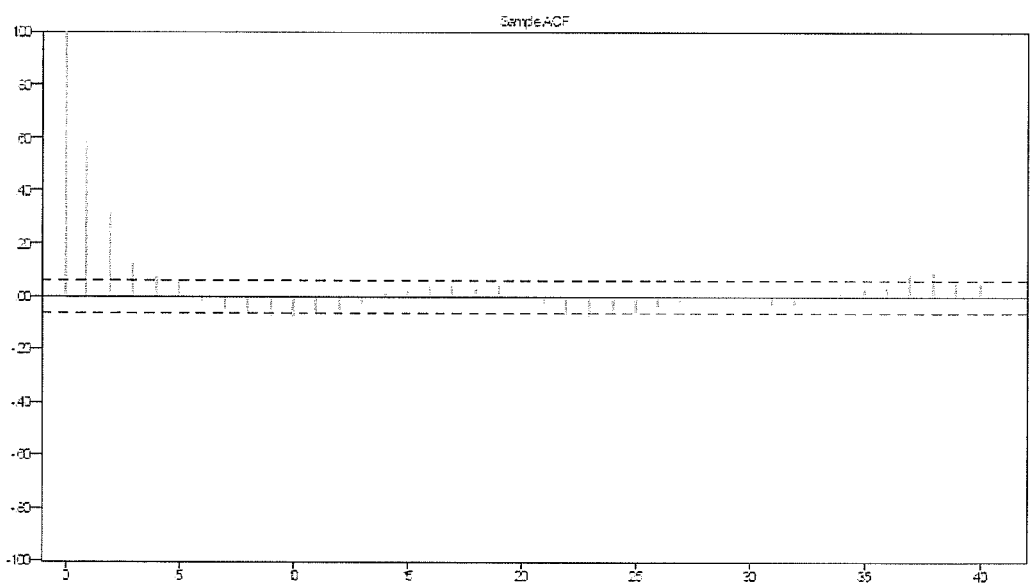
FIG. 5 is a graphical representation of an exemplary autocorrelation function performed on the output signal of FIG. 4.

A graphical illustration of an exemplary autocorrelation function is provided in FIG. 5 for the exemplary output signal represented in the graphical illustration of FIG. 4.

Figure 6:
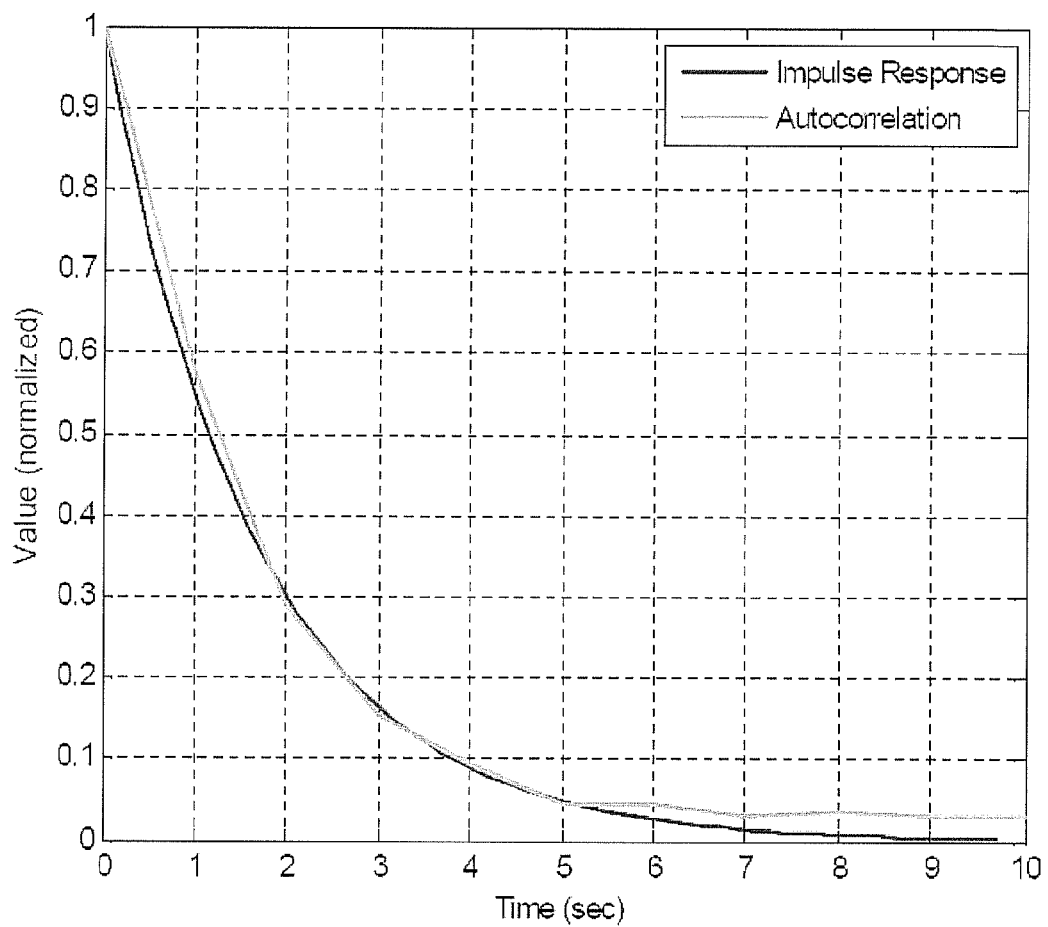
FIG. 6 is a graphical representation comparing an exemplary impulse response signal and autocorrelation signal.

Additional insights are attained by comparing the relation between the impulse response and the covariance function. This relationship can be defined as $$\gamma_{XY}(h) = \sum_{j=0}^{\infty} \psi_j \gamma_X(h-j), \quad (1)$$

where $\{X_t\}$ is the input, $\{Y_t\}$ is the output and $\gamma_{XY}(h)$ is the cross-covariance of the input and the output at lag h. This relation demonstrates a strong link between dynamic properties and second order statistical properties, aspects of which can be appreciated graphically in FIG. 6. FIG. 6 shows the closeness of both impulse response and autocorrelation for an AR(1) system expressed as $X_t = aX_{t-1} + Z_t$.

More particular discussion of the appropriate multivariate signal properties and resultant test statistics will now be provided. It should be appreciated that the relation between the multivariate signal properties constitutes the major concept in deriving the appropriate test statistic for the hypothesis test to assess the similarity between the multivariate autocovariance functions. With particular reference to the multivariate autocovariance function, the multivariate reference system signal $\{X_t\}_{t=1}^N$ and the multivariate test system signal $\{Y_t\}_{t=1}^N$ both have dimension d. A test is developed to assess the equality of their autocovariance matrix functions $\{\Gamma_X(k)\}_{k=0}^\infty$ and $\{\Gamma_Y(k)\}_{k=0}^\infty$, which is expressed in the component by component form $$\Gamma_X(k) = \begin{bmatrix} \gamma_{X11}(k) & \cdots & \gamma_{X1d}(k) \\ \vdots & \ddots & \vdots \\ \gamma_{Xd1}(k) & \cdots & \gamma_{Xdd}(k) \end{bmatrix} \quad (2)$$

$$\text{and } \Gamma_Y(k) = \begin{bmatrix} \gamma_{Y11}(k) & \cdots & \gamma_{Y1d}(k) \\ \vdots & \ddots & \vdots \\ \gamma_{Yd1}(k) & \cdots & \gamma_{Ydd}(k) \end{bmatrix}$$

For one signal, the multivariate spectral density is expressed as:

$$f_X(\omega_j) = \frac{1}{2\pi}\sum_{k=-\infty}^{\infty} \Gamma(k)e^{-i\omega j_k} = \begin{bmatrix} f_{X11}(\omega_j) & \cdots & f_{X1d}(\omega_j) \\ \vdots & \ddots & \vdots \\ f_{Xd1}(\omega_j) & \cdots & f_{Xdd}(\omega_j) \end{bmatrix}, \quad (3)$$

where $f_{kk}(\omega)$, $1 \leq k \leq d$ is the individual component spectral density and $f_{kj}(\omega)$ is the cross spectrum of components k and j at frequency $\omega$. The parameter $i=\sqrt{-1}$ and $\omega$ is the frequency over the range $\omega \in [0, \pi]$ since $f_{kj}(\omega)$ is conjugate even and $f_{kj}(\omega)=f_{kj}(-\omega)^*$, where * denotes complex conjugate transpose. The values of $\omega_j$ can be calculated from $\omega_j=2\pi j/N$, where $0 \leq j \leq N/2$. The periodogram may then be expressed as $I_X(\omega_j)=J_X(\omega_j)J_X^*(\omega_j)$, which is the outer product of the spectral vector. The spectral vector can be defined in terms of the discrete Fourier transform of the multivariate signal as $$J_X(\omega_j) = N^{-1/2}\sum_{t=1}^{N} X_t e^{-it\omega_j}, \quad (4)$$

where $J_X(\omega_j)$ has a multivariate complex normal distribution with mean $\overline{0}$ and variance $2\pi f(\omega_j)$.

To determine the similarity of the autocovariance function of two different series, a hypothesis is set forth which establishes the statistical framework. Under the null hypothesis, reference signal $\{X_t\}_{t=1}^N$ and test signal $\{Y_t\}_{t=1}^N$ have equal autocovariance functions $\{\Gamma_X(k)\}_{k=0}^\infty = \{\Gamma_Y(k)\}_{k=0}^\infty$, and also equal spectral density for each frequency over the range $0 \leq \omega \leq \pi$. Further, since both $f_X(\omega)$ and $f_Y(\omega)$ are Hermitian non-negative definite matrices, they can be rewritten as:

$$f_X(\omega)=s_X(\omega)s_X(\omega)^* \text{ and } f_Y(\omega)=s_Y(\omega)s_Y(\omega)^*. \quad (5)$$

The spectral vectors for both signals can be expressed as $$J_X(\omega_j)=s_X(\omega_j)z_X(\omega_j) \text{ and } J_Y(\omega_j)=s_Y(\omega_j)z_Y(\omega_j), \quad (6)$$

where $z_X(\omega_j)$ and $z_Y(\omega_j)$ are standard complex normal multivariate random variables.

At each Fourier frequency $\omega_j$, and for M independent samples of equal length W from each signal with $M \geq d$, a block matrix of the corresponding spectral vector can be expressed as $$H_X(\omega_j)=[J_{X_1}(\omega_j),J_{X_2}(\omega_j),\ldots,J_{X_M}(\omega_j)] \quad (7a)$$

$$H_Y(\omega_j)=[J_{Y_1}(\omega_j),J_{Y_2}(\omega_j),\ldots,J_{Y_M}(\omega_j)] \quad (7b)$$

Multiplying by the conjugate transpose and applying the decomposition defined in equation (6) to the block matrices $H_X(\omega_j)$ and $H_Y(\omega_j)$ yields $$H_X(\omega_j)H_X(\omega_j)^*=s_X(\omega_j)(z_{X_1}(\omega_j),\ldots,z_{X_M}(\omega_j))(z_{X_1}(\omega_j),\ldots,z_{X_M}(\omega_j))^*s_X(\omega_j)^* \quad (8a)$$

$$H_Y(\omega_j)H_Y(\omega_j)^*=s_Y(\omega_j)(z_{Y_1}(\omega_j),\ldots,z_{Y_M}(\omega_j))(z_{Y_1}(\omega_j),\ldots,z_{Y_M}(\omega_j))^*s_Y(\omega_j)^*. \quad (8b)$$

The Gram matrices $G_X(\omega_j)=(z_{X_1}(\omega_j),\ldots,z_{X_M}(\omega_j))(z_{X_1}(\omega_j),\ldots,z_{X_M}(\omega_j))^*$ and $G_Y(\omega_j)=(z_{Y_1}(\omega_j),\ldots,z_{Y_M}(\omega_j))(z_{Y_1}(\omega_j),\ldots,z_{Y_M}(\omega_j))^*$ have a central complex Wishart distribution expressed as $G_X(\omega) \sim W_{Xd}(M, I)$ and $G_Y(\omega) \sim W_{Yd}(M, I)$. Considering the natural logarithm of the determinants, one has $$\log\{\det[H_X(\omega_j)H_X(\omega_j)^*]\}-\log\{\det[H_Y(\omega_j)H_Y(\omega_j)^*]\}=\log\{\det[G_X(\omega_j)]\}-\log\{\det[G_Y(\omega_j)]\} \quad (9)$$

and hence a test statistic (TS) can be expressed as $$TS=\log\{\det[H_X(\omega_j)H_X(\omega_j)^*]\}-\log\{\det[H_Y(\omega_j)H_Y(\omega_j)^*]\}, \quad (10)$$

which has a zero mean and a variance equal to the Euler Trigamma function with parameter M. For large N, the asymptotic normality $$TS \sim AN\left(0, 2\sum_{l=0}^{d-1}\dot{\psi}(M-l)\right)$$

can be applied to obtain appropriate false alarm confidence limits. For a level of significance $\alpha$, the probability of rejecting the null hypothesis is $$P\left(|TS|/\sqrt{2\sum_{l=0}^{d-1}\dot{\psi}(M-l)} > \Phi_{1-\alpha/2}\right) = \alpha, \quad (11)$$

where $\Phi_{1-\alpha/2}$ is the standard normal quantile corresponding to a cumulative probability of $1-0.5\alpha$.

The test statistic and signal similarity comparisons derived above in equations (10) and (11) can be used when it is desired to implement the subject signal processing techniques in the frequency domain. However, it should be appreciated that the analysis can also be done in the time domain. The following discussion now describes how to develop a time domain test statistic to assess multivariate signal equality. The test is based on Bartlett's asymptotic formula for multivariate stationary series. Specifically, let $$\Gamma(h) = E[X_{t+h}X_t'] = \{\gamma_{i,j}(h)\}_{i,j=1}^d \quad (12)$$

and $$\hat{\Gamma}(h) = \frac{1}{N}\sum_{t=1}^{N-h}(X_{t+h}-\overline{X})(X_t-\overline{X})' = \{\hat{\gamma}_{i,j}(h)\}_{i,j=1}^d \quad (13)$$

denote the theoretical and sample autocovariances, respectively, of a d-dimensional multivariate series $\{X_t\}$ at lag h. Here, $\overline{X}=N^{-1}\Sigma_{t=1}^N X_t$, where N is the series length. Bartlett's result states that the collection of sample autocovariances $\hat{\gamma}_{i,j}(h)$ are jointly asymptotically normal with $$\lim_{n\to\infty} n\text{Cov}(\hat{\gamma}_{i,j}(p), \hat{\gamma}_{k,l}(q)) = \quad (14)$$

$$\sum_{r=-\infty}^{\infty}\{E[X_{t,i}X_{t+p,j}X_{t+r,k}X_{t+r+q,l}] - \gamma_{i,j}(p)\gamma_{k,l}(q)\}.$$

The technical assumptions needed here are that $\{X_t\}$ has the linear process representation $$X_t = \sum_{k=-\infty}^{\infty}\Psi_k Z_{t-k}, \quad (15)$$

where $\{Z_t\}$ is independent and identically distributed zero mean noise with a finite fourth moment and $\Sigma_{k=-\infty}^{\infty}|\Psi_k|<\infty$ (in a component by component sense). These assumptions ensure that $\{X_t\}$ is fourth order stationary (in fact $\{X_t\}$ is strictly stationary), which implies that $E[X_{t,i}X_{t+p,j}X_{t+r,k}X_{t+r+q,l}]$ does not depend on t.

In the case where $\{X_t\}$ is Gaussian, equation (14) simplifies to $$\lim_{n\to\infty} n\text{Cov}(\hat{\gamma}_{i,j}(p), \hat{\gamma}_{k,l}(q)) = \qquad (16)$$

$$\sum_{r=-\infty}^{\infty} [\gamma_{i,k}(r)\gamma_{j,l}(r-p+g) + \gamma_{i,l}(r+q)\gamma_{j,k}(r-p)]$$

The test statistic (TS) assessing multivariate signal equality is simply $$TS = \frac{n}{2}\Delta\hat{\Gamma}^T \hat{W}^{-1} \Delta\hat{\Gamma}. \qquad (17)$$

Here, $\widehat{\Delta\Gamma}$ is an $Ld^2+d(d-1)/2$ dimensional vector whose elements are aggregated from sample autocovariances at lags 0, 1, ..., L as follows. Specifically, define $$\eta(h)_{i,j} = \hat{\gamma}_X(h)_{i,j} - \hat{\gamma}_Y(h)_{i,j}$$

for $h \geq 0$ and $1 \leq i,j \leq d$. The first $d(d-1)/2$ elements of $\widehat{\Delta\Gamma}$ are obtained by stacking the lag h=0 components of η in the order $\eta(0)_{1,1}, \ldots, \eta(0)_{1,d}; \eta(0)_{2,2}, \ldots, \eta(0)_{2,d}; \eta(0_{d,d}$. The next $d^2$ elements of $\widehat{\Delta\Gamma}$ are simply the lag h=1 components of η stacked in the usual 'row first column second order' of $\eta(1)_{1,1}, \ldots, \eta(1)_{1,d}; \ldots; \eta(1)_{d,1}, \ldots, \eta(1)_{d,d}$. The remaining components of $\widehat{\Delta\Gamma}$ are the lag 2, ..., L components of η stacked in a row first column second order (there are $d^2$ components for each lag. As $\hat{\gamma}_{i,j}(0) = \hat{\gamma}_{j,i}(0)$, we cannot use entries from 'both above and below the main diagonal' for lag h=0 as this would make the covariance matrix of $\widehat{\Delta\Gamma}$ singular. The quantity $\hat{W}$ is simply the covariance matrix of $\widehat{\Delta\Gamma}$, computed via estimating quantities in equation (14). Fourth moments are estimated as $$\hat{E}[X_{0,i}X_{p,j}X_{r,k}X_{r+q,l}] = N^{-1}\sum_{t\in S} X_{t,i}X_{t+p,j}X_{t+r,k}X_{t+r+q,l}, \qquad (18)$$

where the set S contains all indices t such that t, t+p, t+r, and t+r+q all lie in $\{1, \ldots, N\}$. The infinite sum in equations (14) or (16) is truncated at $\pm N^{1/3}$. Specifically, $$\hat{\text{Cov}}(\hat{\gamma}_{i,j}(p), \hat{\gamma}_{k,l}(q)) = \qquad (19)$$

$$N^{-1}\sum_{|r|\leq N^{1/3}} [\hat{\gamma}_{i,k}(r)\hat{\gamma}_{j,l}(r-p+q) + \hat{\gamma}_{i,l}(r+q)\hat{\gamma}_{j,k}(r-p)]$$

can be used as an estimator of the components in W. In equation (19), $$\gamma_{i,j}(h) = \frac{1}{2}[\hat{\gamma}_{X:i,j}(h) + \hat{\gamma}_{Y:i,j}(h)]$$

is used as the estimate of $\gamma_{i,j}(h)$ under the null hypothesis of signal equality. Here, the subscripts of X and Y merely refer to sample covariances computed from the reference signal $\{X_t\}$ and the target signal $\{Y_t\}$ respectively.

In conclusion, the multivariate time domain test rejects signal equality when TS is too large to be explained by chance variation. Specifically, the distribution of TS under the null hypothesis of signal equality is chi-squared with $d(d-1)/2 + d^2L$ degrees of freedom.

Figure 3:
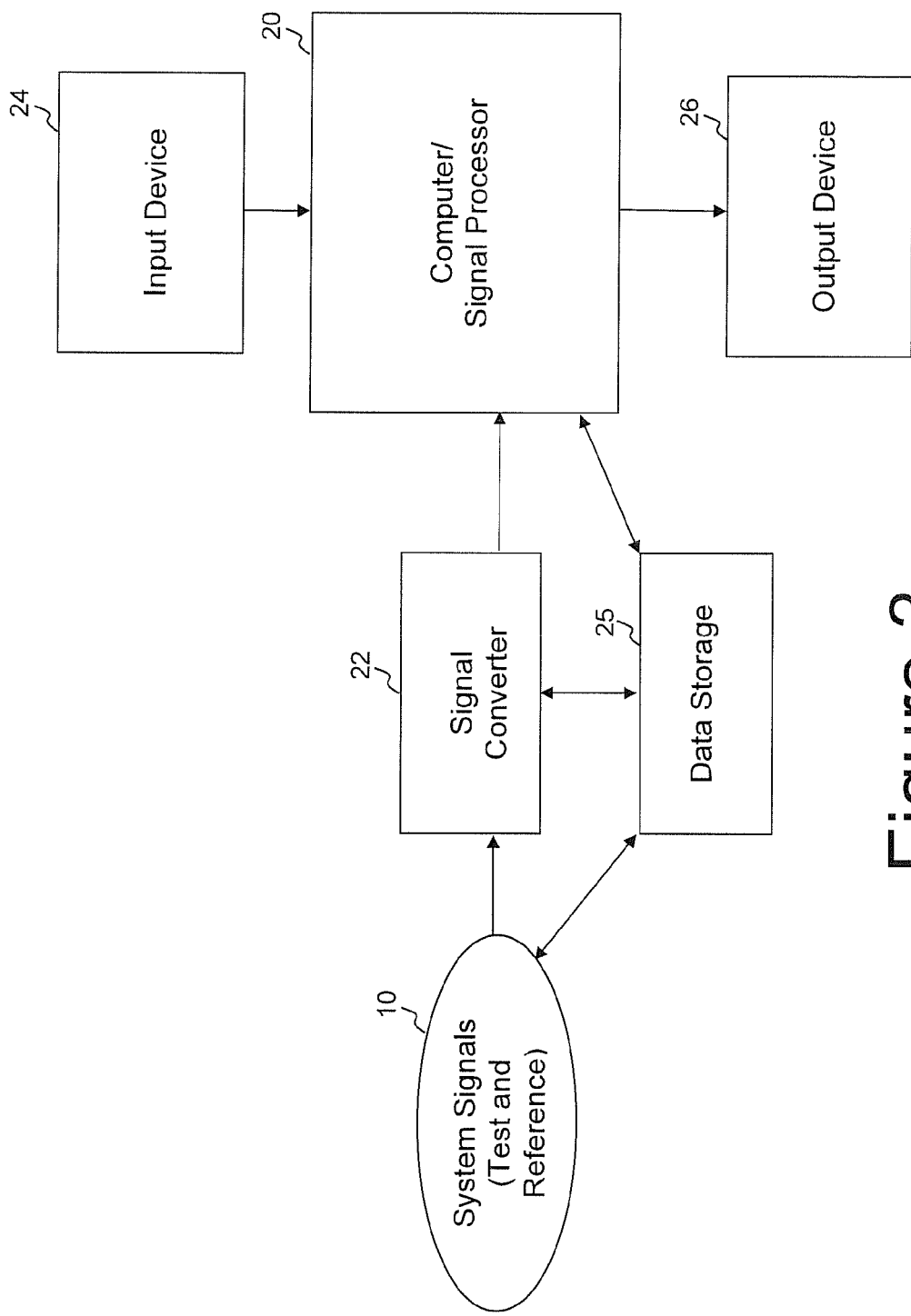
FIG. 3 is a schematic block diagram of exemplary hardware components for implementing steps of the present signal processing methodology.

More particular aspects of how the subject dynamic system assessment methodology can be implemented will now be discussed with reference to FIGS. 1a, 1b and 3. With reference to FIG. 3, the system signals to be monitored (generally including both test and reference signals 10) are provided to a computer 20 or other general-purpose or customized computing or processing device having any suitable form of hardware architecture or configuration that can be adapted to implement digital signal processing techniques. Although FIG. 3 only illustrates a single computer or processing device 20, it should be appreciated that multiple processors operating independently or in a collaborative series, parallel or distributed fashion may be utilized to implement the subject technology.

Embodiments of the methods and systems set forth herein may be implemented by one or more of such computers 20 that access software instructions rendered in a computer-readable form, which thus configure the computing device(s) to function as special purpose machine(s) adapted to perform designated algorithmic steps. Software instructions may be stored in one or more portions of computer-readable media as computer-readable instructions which, when executed by at least one computer 20, cause the at least one computer to implement one or more embodiments of the methods disclosed herein. Any suitable computer-readable medium or media may be used to implement or practice the presently-disclosed subject matter, including diskettes, drives, and other magnetic-based storage media, optical storage media, including disks (including CD-ROMS, DVD-ROMS, and variants thereof), flash, RAM, ROM, and other memory devices, and the like. Further, any suitable programming, scripting, or other type of language or combinations of languages may be used to implement the teachings contained herein. Embodiments of the methods and systems set forth herein may alternatively be implemented by hard-wired logic or other circuitry, including, but not limited to application-specific circuits. Of course, combinations of computer-executed software and hard-wired logic may be suitable, as well.

In one embodiment, the computer-readable media is embodied by data storage element 25 depicted in FIG. 3. Data storage 25 may be coupled to computer/signal processor 20 such that the processor 20 can have direct access to executable instructions or to system data which may be stored therein. Additional data that may be stored in data storage 25 may include one or more of the system signals (i.e., test and reference signals provided at element 10), threshold levels customizably selected by a user via input device 24, and processing outputs generated by the processor 20, including but not limited to data indicating the failure instances and corresponding probabilities associated with signal similarity comparisons of the present technology.

Referring still to FIG. 3, system signals 10 may in some embodiments be relayed through a signal converter 22 before being received at computer 20. Signal converter 22 may be employed to render system signals 10 in a format that is compatible with the computer 20. In one example, signal converter 22 corresponds to an analog-to-digital (A/D) converter or the like. One or more input device 24 may also be coupled to computer 22. Input device may correspond, for example, to such devices as a keyboard, mouse, touch-screen, scanner, microphone or other device with which a user may provide input to computer 22. Input device 24 may be employed by a user to set customizable threshold limits and other parameters associated with the subject system diagnostics. Output device 26 may correspond, for example, to one or more of such devices as a display, monitor, printer, speaker or the like for providing output to a user. A visual, audio or other output preferably relays in a user-accessible form the results of the system analysis conducted by computer 20. In one embodiment, numeric and/or graphical illustrations of the comparisons may be provided. In another embodiment, outputs indicate the occurrence or detection of a fault (such as by a triggered visual or audible alarm output). Variations to the exemplary input and output devices should be appreciated by one of skill in the art and is not intended to limit the scope of the present technology. It should be appreciated that in some embodiments, a single device can serve as an integrated input and output (I/O) device as opposed to having separate devices 24 and 26 as illustrated in FIG. 3.

Figure 1B:
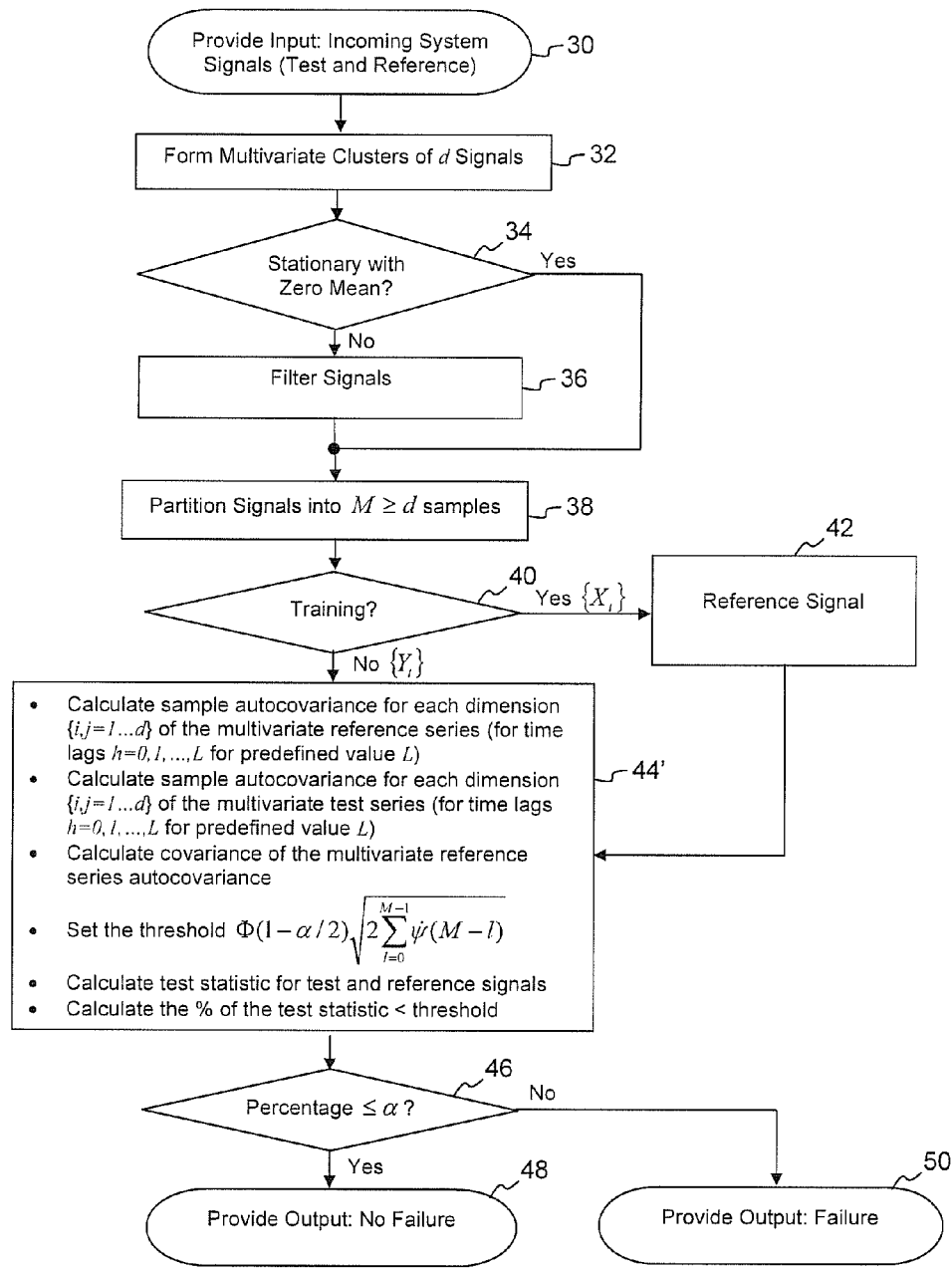
FIG. 1b is a flow diagram of exemplary steps associated with time-domain signal processing techniques of the present invention.

The computer of FIG. 3 functions to implement various algorithmic steps as set forth in FIGS. 1a, 1b, 2a and 2b. More particular aspects of such steps will now be discussed with reference to FIGS. 1a and 1b. FIGS. 1a and 1b include many of the same steps, and discussion of a step with reference to one figure should equally apply where appropriate to the same step in the other figure.

A first step 30 involves providing incoming system signals. In one embodiment, at least one test signal and at least one reference signal are provided. In preferred embodiments, the test and reference signals are multivariate signals. Steps 32, 34, 36 and 38 may all be part of what are generally referred to as pre-processing steps 12a and 12b in FIG. 2a. Step 32 involves forming multivariate clusters of d signals. Provision of a signal cluster helps achieve improved diagnostic results by considering information included in the inter-correlation between different signals, as opposed to mere single signal analysis. Such inter-correlation directly contributes to the depiction of system dynamics and raises the information base for system analysis from d to $d^2$, where d is the number of signals in the multivariate cluster.

Signals are then analyzed in step 34 to determine if they are stationary (statistically time invariant) with zero mean. If signals are determined to be stationary in step 34, then the algorithm proceeds to a partitioning step 38. If not, the signals may first be filtered in step 36 to help guarantee test conditions. In one embodiment, filtering step 36 involves application of a linear filter so that signal mapping will correspond to the same probability space mapping. In another embodiment, filters of the "ARIMA (p,d,q)" type are applied to shorten the signal memory component, remove periodicities, and guarantee a zero-mean condition. In this expression of an ARIMA model, p represents the auto regressive order, d the time shift value, and q the moving average order.

Referring still to FIGS. 1a and 1b, pre-processing step 38 involves partitioning the test and reference signals into M samples, where M≧d. Independence of the M samples may be achieved by separating samples by a buffer period, $\kappa$, that satisfies $$\lim_{N \to \infty} \frac{\kappa}{N} = 0.$$

The buffer period may be chosen such that the time correlation of the signal at lag $|\kappa|$ is statistically insignificant. In one embodiment, the buffer period $\kappa$ may be selected to be greater than $t_c$, which is the time lag value of the highest existing time correlation in the data.

Signal partitioning of test and reference signals as described above in step 38 may be utilized as part of a prognostics application in one embodiment of the present technology, which generally helps to describe and forecast slow time drifts and other aspects of system behavior. For example, a sliding subseries of test and reference signals may be obtained by using a variety of time-shifted samples, such as described above. The test statistic formula(s) disclosed herein can be applied to selected subseries of the signal samples to create and analyze a sequence of test statistics which can be analyzed for trends. From the collection of sequenced information obtained from testing various signal samples, it is possible for a user to determine the likelihood of violating a prescribed threshold value at some time in the future. In this manner, test statistics can provide not only information about what is happening in a test system at the past or present time, but also a forecast of likely system performance in the future.

At step 40, signals may be separately routed depending on whether training is needed or desired for the signals. In one embodiment as illustrated in FIG. 1a, Y(t), which is the set of multivariate test signals, is provided directly to processing step 44. At step 42, pre-processed reference signals may be stored in one or more dynamic conditions library. Reference and test signals are ultimately both provided to processing step 44, where the dynamic system comparison is effected as a process of multiple substeps. Step 44 in FIG. 1a is generally directed to processing in the frequency domain, and step 44' of FIG. 1b is generally directed to processing in the time domain. Additional discussion of both steps 44 and 44' will now be presented in order.

In step/process 44, Fast Fourier Transforms (FFTs) are used to speed up computations and make the algorithm more suitable for real-time applications. Thus, for each frequency and each sample, the spectral vectors $J_{Xi}(\omega_j)$ and $J_{Yi}(\omega_j)$ are calculated, where $1 \leq i \leq M$. For each frequency, the block matrices $H_X(\omega_j) \cdot H_Y(\omega_j)$ of the spectral vectors are formed corresponding to the different samples. A threshold variable $\alpha$ is established as $$\Phi(1-\alpha/2) \sqrt{\sum_{l=0}^{M-1} \psi(M-l)},$$

and the test statistic defined by equation (10) is calculated for each frequency (or some selected subset of frequencies). In accordance with customizable aspects of the present technology, the threshold can be adjusted to accommodate for small deviations and thus develop a more robust methodology. A calculation is then performed that determines the percentage of the test statistic that is less than or equal to the threshold value $\alpha$. The results of the algorithmic analysis and signal comparison may be provided as output to a user in a variety of forms as previously mentioned. In the exemplary embodiment of FIG. 1a, if the test statistic percentage is less than the threshold value, then no system failure is indicated at step 48. A fault will be signaled at step 50 if the test statistic percentage is less than the defined threshold.

In step/process 44' of FIG. 1b, sample auto covariance functions are calculated for each dimension $\{i,j=1 \ldots d\}$ of each of the multivariate test and reference series signals. The sample auto covariance functions are calculated for a plurality of time lags, specifically for time lags h=0, 1, . . . , L for some predetermined value of L. The covariance of the multivariate reference series autocovariance is also calculated in step 44'. These various calculated quantities are used to generate the test statistic defined in equation (17). A threshold variable α is also established as $$\Phi(1-\alpha/2)\sqrt{\sum_{l=0}^{M-1}\hat{\psi}(M-l)}.$$

In accordance with customizable aspects of the present technology, the threshold can be adjusted to accommodate for small deviations and thus develop a more robust methodology. A calculation is then performed that determines the percentage of the test statistic that is less than or equal to the threshold value α. The results of the algorithmic analysis and signal comparison may be provided as output to a user in a variety of forms as previously mentioned. In the exemplary embodiment of FIG. 1b, if the test statistic percentage is less than the threshold value, then no system failure is indicated at step 48. A fault will be signaled at step 50 if the test statistic percentage is less than the defined threshold.

The present invention may be better understood with reference to the following examples.

EXAMPLE 1

The disclosed system diagnostics technology was applied to monitor the fuel flow rate signals for a Mercury® brand stationary gas turbine, such as manufactured and sold by Solar Turbines Incorporated, a company owned by Caterpillar, which is typically used to supply peak load shaving power to a facility during periods of high demand. Operation of this exemplary turbine has an average of six hours continuous rating per run, with a maximum rating of 4.5 MW. The Mercury 50 turbine is a stand-alone turbine which has an extensive array of sensors that may be monitored in real-time. A communication interface was established between the turbine controller and a data acquisition station.

Two experimental faults were introduced to the Mercury 50 turbine. A first fault was a partial blockage of the oil cooler air passage that mimics possible blockage caused by slug formation. The partial blockage began after approximately two hours of normal operation and continued for another seventy-five (75) minutes before the oil header temperature sensor reading triggered a red-line alarm and initiated a turbine shut down for high oil temperature. During this period, the oil header temperature rose 37.5% from forty-eight degrees Celsius (48° C.) to sixty-six degrees Celsius (66° C.). The second experimental fault represents a situation during normal operation in which the compressor relief valve partially opens with no control command causing a compressor pressure leak and affecting the turbine power rating. To replicate this situation experimentally, the calculation block of the turbine controller was given a false feedback value indicating that the relief valve was fully closed while it was manually kept open at about a 2.0% rate. The true feedback signal of the valve position was overridden to mimic the actual leak situation. Based on these two faults, different fault scenarios were implemented to investigate the robustness and sensitivity of the proposed strategy.

Figure 7:
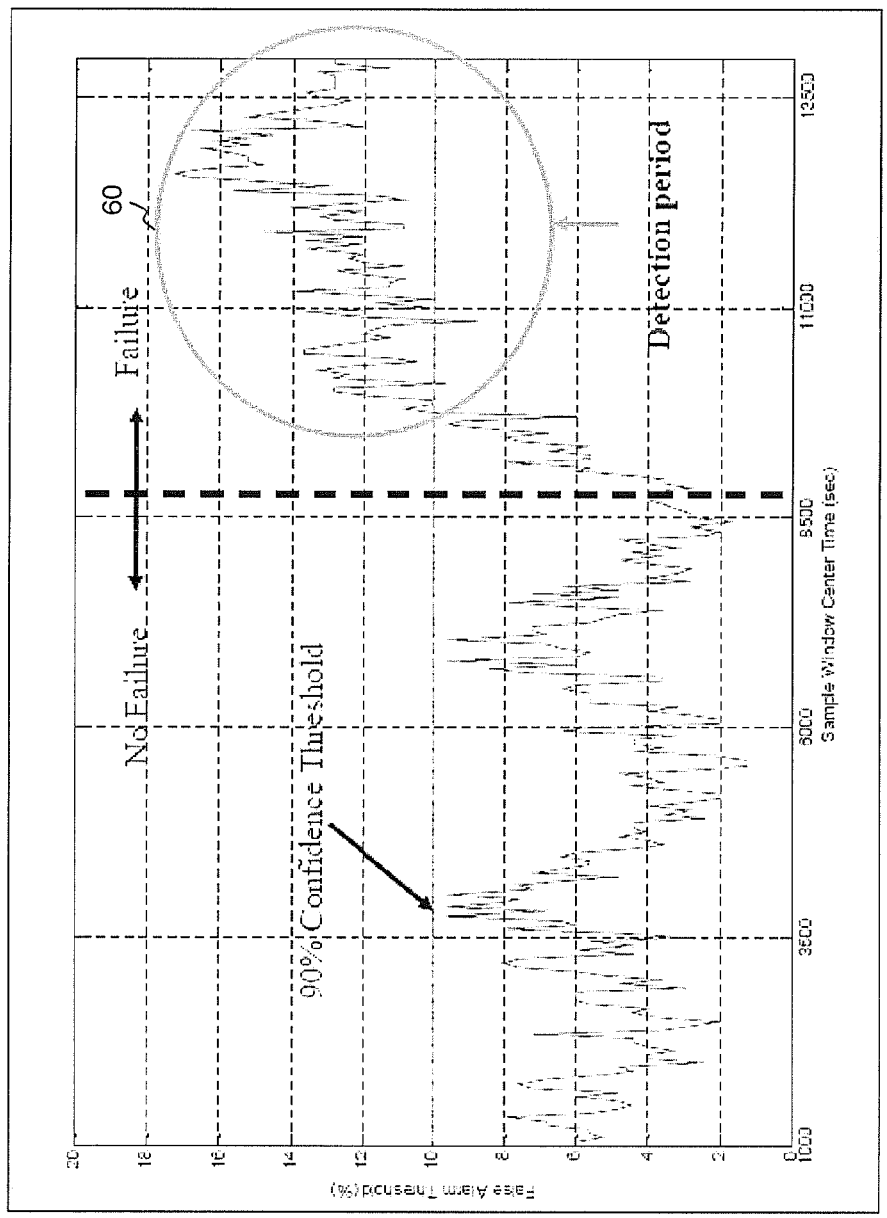
FIG. 7 is a graphical representation of an experimental fault application for oil cooler blockage performed using diagnostics techniques of the present invention.
Figure 8:
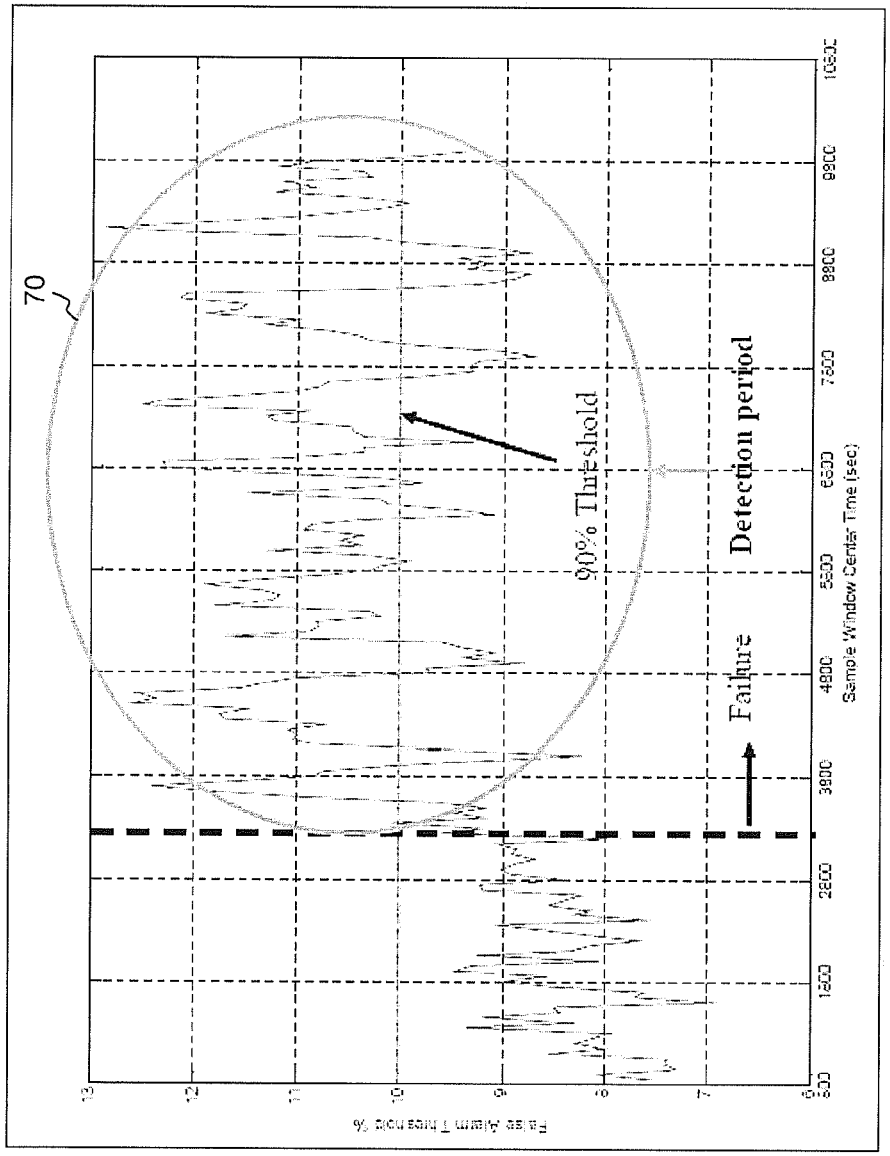
FIG. 8 is a graphical representation of an experimental fault application for high frequency relief valve chattering using diagnostics techniques of the present invention.

For all fault scenarios, a bi-variate signal cluster composed of the pressure at the compressor delivery (PCD) and the generated power (power in MW) was selected. This cluster represents both the thermo-fluidic and the electrical properties of the gas turbine. Another signal that may be monitored is the turbine rotor inlet temperature (TRIT). For this cluster, two sample segments of width W, with 750 data points and a single buffer zone κ of 15 data points were chosen to make a total sample length of 1515 seconds based on a sample rate of one second. This sample length was appropriate to accommodate both the data volume and the fault detection resolution. A sliding sampling procedure was applied with a varying step ranging from five to forty seconds according to the total duration observation. All test and reference signals were preprocessed with an ARIMA(0,1,0) filter. For each sample, the test statistic was calculated for each Fourier frequency and the probability, P, was calculated, as expressed in equation (11), based on a confidence limit of ten percent (10%). A graphical representation of the threshold percentage comparison versus time is provided in FIG. 7. The portion 60 of the signal output that exceeded the 90% confidence threshold (i.e., when variation in temperature reaches 10%) indicated a failure condition. It should be appreciated that in some embodiments, additional processing could be implemented to account for signal spikes, noise or other signal occurrences that may affect false fault detection. FIG. 8 provides a graphical illustration of the second exemplary experimental fault, which simulated a compressor relief valve leak. The selected signal cluster again included PCD and generated power, and a similar 10% false alarm threshold was utilized. Fault detection existed during the time period 70 illustrated in FIG. 8.

EXAMPLE 2

The above time-domain processing techniques as most particularly described with reference to FIGS. 1b and 2b were used to study monthly weather patterns of two nearby cities, namely Athens and Atlanta, Ga., in the United States. Athens and Atlanta both lie in the Piedmont region of North Georgia, approximately seventy-five miles apart. Local folklore states that the two towns enjoy similar weather. Actual operational similarity of the weather patterns can be analyzed using the disclosed techniques, which were particularly applied to temperature and precipitation analysis for the two cities.

Figure 9A:
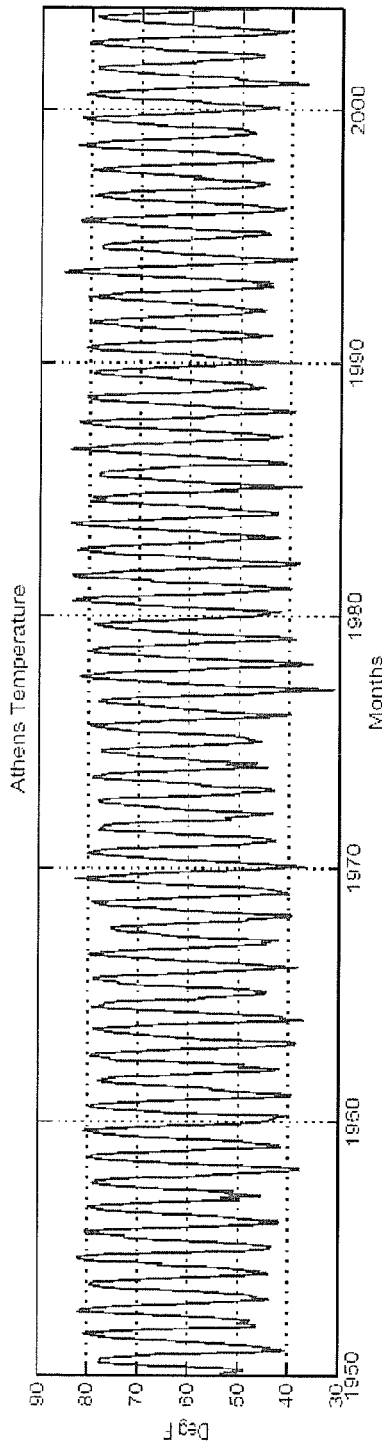
FIGS. 9a and 9b are respective graphical representations of an experimental temperature correlation between two nearby cities using diagnostic techniques of the present invention.
Figure 9B:
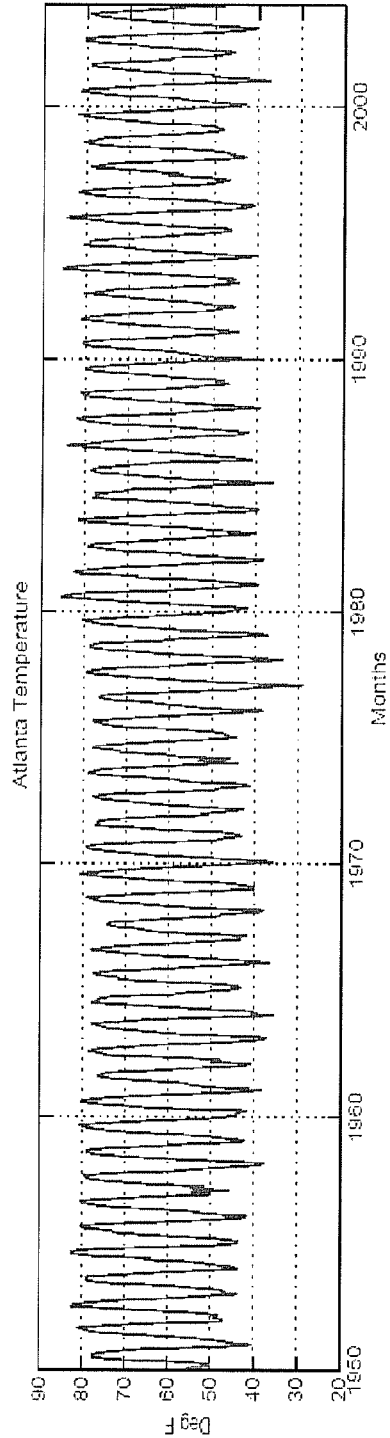
Figure 10A:
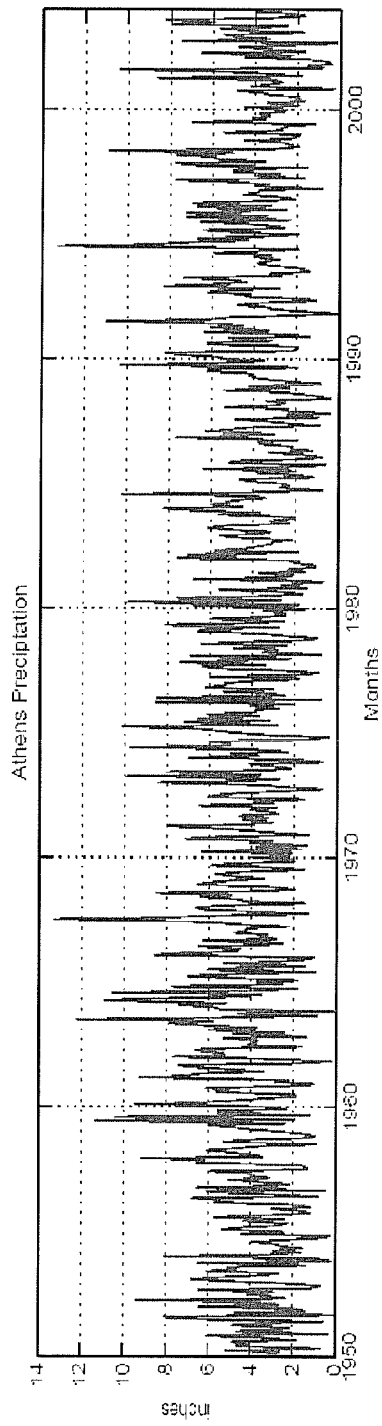
FIGS. 10a and 10b are respective graphical representations of an experimental precipitation correlation between two nearby cities using diagnostic techniques of the present invention.
Figure 10B:
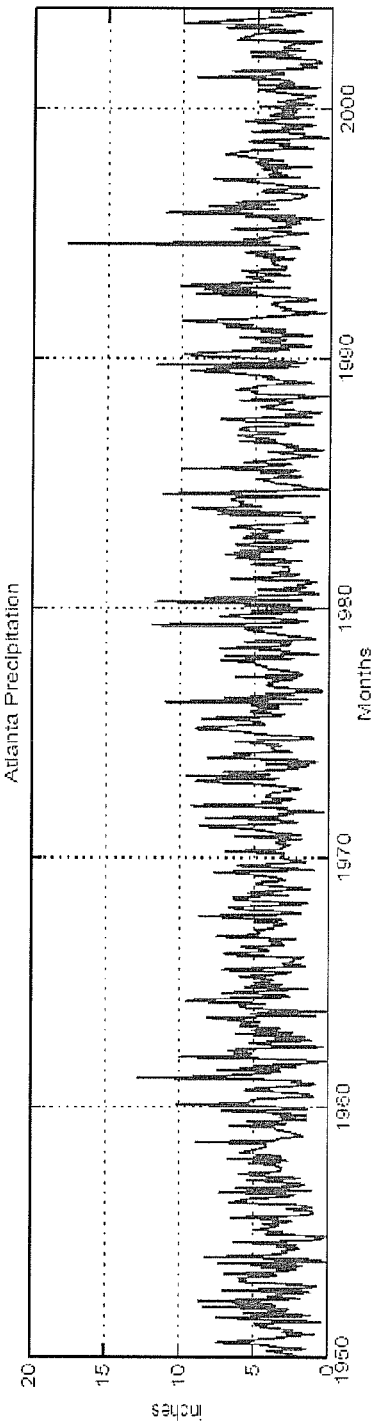

FIGS. 9a and 9b display monthly average temperatures for Athens and Atlanta, respectively. The temperatures are averaged over all days in each month for both stations during a time period inclusive of January 1950 until December 2003. There are N=648 observations for each series. FIGS. 10a and 10b respectively display the total monthly precipitation at the Athens and Atlanta stations over the same period of record as the temperatures of FIGS. 9a and 9b. Here, the number of dimensions d=2 for the analyzed signals.

As seasonality is clearly present in the temperatures (winter temperatures are colder and more variable than summer temperatures), some preprocessing of the individual series is helpful. Although rainfall has a "weaker" seasonal cycle than temperatures, a seasonal mean is still present. (NOTE: Fall months are driest and Spring months are wettest.) To make zero mean stationary series, preprocessing may simply adjust these series by subtracting a monthly sample mean and then dividing by a monthly sample standard deviation.

The time domain statistic TS for multivariate signal equality of the seasonally adjusted series, as calculated from the formula set forth in equation (17) is TS=14.773 with L=5 and a corresponding p-value (i.e., probability of accurate signal similarity comparison) of approximately 0.9206. With L=10, the test statistic TS=22.5796 with a corresponding p-value of 0.9956. Because both calculations enjoy a relatively high p-value, conclusions can be made with a large degree of confidence that Athens and Atlanta do indeed enjoy similar weather.

It is appreciated by persons skilled in the art that what has been particularly shown and described above is not meant to be limiting, but instead serves to show and teach various exemplary implementations of the present subject matter. The scope of the present invention includes both combinations and sub-combinations of various features discussed herein, along with such variations and modifications as would occur to a person of skill in the art. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:

1. A method for assessing dynamic system similarity, said method comprising the following steps:
   providing at least one multivariate test signal associated with an operational system;
   providing at least one multivariate reference signal associated with the operational system;
   comparing the signal similarity of the second-order moment of the at least one multivariate test signal with the second-order moment of the at least one multivariate reference signal;
   establishing a selected threshold level defining a maximum allowable deviation for the signal similarity of the second-order moments of the at least one multivariate test and reference signals;
   determining when the signal similarity of the second-order moments of the at least one multivariate test and reference signals fails to remain within the selected threshold level; and
   providing output to a user indicating instances when the selected threshold level is exceeded;
   wherein said step of comparing the signal similarity is performed using time-domain processing techniques and more particularly comprises the steps of:
      calculating the auto-covariance matrix functions for the at least one respective multivariate test and reference signals;
      calculating the covariance of the auto-covariance of the at least one multivariate reference signal;
      generating a test statistic using in part the calculated auto-covariance matrix functions for the at least one respective multivariate test and reference signals and the covariance of the auto-covariance of the at least one multivariate reference signal;
      determining when the test statistic crosses the selected threshold level.

2. The method of claim 1, wherein elements of each auto-covariance matrix function are calculated for different time lags from time 0, 1, 2, . . . , L, for a predetermined value L.

3. The method of claim 1, further comprising a step implemented before said comparing step of pre-processing the at least one multivariate test and reference signals, wherein the same pre-processing techniques are applied to both of the at least one multivariate test and reference signals, and wherein the pre-processing techniques are configured to increase signal stationarity.

4. The method of claim 3, wherein said step of pre-processing comprises one or more of filtering and sampling the at least one multivariate test and reference signals.

5. The method of claim 1, wherein said step of providing output to a user comprises providing a probability calculation for each instance when the selected threshold is exceeded to indicate to the user the probability that the detection of signal dissimilarity is accurate.

6. The method of claim 1, wherein said comparing and determining steps are performed for a series of time-shifted samples of the at least one respective multivariate test and reference signals.

7. The method of claim 6, further comprising a step of providing output to the user indicating the likelihood that the selected threshold level will be violated by the operational system at a future time based on the comparing and determining steps performed for the selected time-shifted samples of the at least one respective multivariate test and reference signals.

8. A system for assessing dynamic system similarity, comprising:
   a signal processor adapted to:
      (i) receive at least one multivariate test signal and at least one multivariate reference signal associated with an operational system;
      (ii) compare the signal similarity of the second-order moment of the at least one multivariate test signal with the second-order moment of the at least one multivariate reference signal; and
      (iii) determine when the signal similarity of the second-order moments of the at least one multivariate test and reference signals fails to remain within a preselected threshold of signal similarity;
   an output device coupled to said signal processor, said output device configured to provide visual or audio output to a user indicating instances when the selected threshold level of signal similarity is not met; and
   wherein said signal processor is further adapted to:
      calculate the auto-covariance matrix functions for the at least one respective multivariate test and reference signals;
      calculate the covariance of the auto-covariance of the at least one multivariate reference signal;
      generate a test statistic using in part the calculated auto-covariance matrix functions for the at least one respective multivariate test and reference signals and the covariance of the auto-covariance of the at least one multivariate reference signal; and
      determine when the test statistic fails to remain within the preselected threshold of signal similarity.

9. The system of claim 8, further comprising an input device adapted for providing user selection of the threshold used to determine signal similarity.

10. The system of claim 8, further comprising a data storage element coupled to said signal processor for storing executable instructions, selected ones of the at least one multivariate test and reference signals, and selected outputs calculated by said signal processor.

11. The system of claim 8, wherein said signal processor is adapted to calculate elements of each auto-covariance matrix function for different time lags from time 0, 1, 2, . . . , L, for a predetermined value L.

12. The system of claim 8, wherein said signal processor is further adapted to implement similar pre-processing techniques to the at least one multivariate test and reference signals to increase signal stationarity.

13. The system of claim 12, wherein the pre-processing techniques implemented by said signal processor comprise one or more of filtering and sampling the at least one multivariate test and reference signals.

14. The system of claim 8, wherein said signal processor is further adapted to compare the signal similarity of the second-order moment of the at least one multivariate test signal with the second-order moment of the at least one multivariate reference signal for a series of time-shifted samples of the at least one respective multivariate test and reference signals.

15. The system of claim 14, wherein said output device is further configured to provide output to the user indicating the likelihood that the selected threshold level of signal similarity will be met at a future time based on the sequence of comparisons made for the selected time-shifted samples of the at least one respective multivariate test and reference signals.

* * * * *

UNITED STATES PATENT AND TRADEMARK OFFICE
CERTIFICATE OF CORRECTION

| | | |
|---|---|---|
| PATENT NO. | : 8,378,816 B2 | Page 1 of 1 |
| APPLICATION NO. | : 12/668768 | |
| DATED | : February 19, 2013 | |
| INVENTOR(S) | : John R. Wagner et al. | |

It is certified that error appears in the above-identified patent and that said Letters Patent is hereby corrected as shown below:

In the Specification

Column 1, line 12 (insert prior to BACKGROUND OF THE INVENTION) -- This invention was made with government support under grant number DE-FC26-02NT41431 awarded by the Department of Energy and grant number NSF-DMS-0529861 by the National Scientific Foundation. The government has certain rights in the invention. --

Signed and Sealed this
Twenty-sixth Day of May, 2015

Michelle K. Lee
*Director of the United States Patent and Trademark Office*